Dec. 13, 1938.   E. RIEMENSCHNEIDER   2,139,771
METHOD AND APPARATUS FOR WELDING
Filed Nov. 3, 1932   5 Sheets-Sheet 1

INVENTOR
*Ernest Riemenschneider*
BY
*Louis W. Kelmuth*
ATTORNEY

Dec. 13, 1938.  E. RIEMENSCHNEIDER  2,139,771
METHOD AND APPARATUS FOR WELDING
Filed Nov. 3, 1932  5 Sheets-Sheet 4

INVENTOR
BY *ERNEST RIEMENSCHNEIDER*
ATTORNEY

Dec. 13, 1938.  E. RIEMENSCHNEIDER  2,139,771
METHOD AND APPARATUS FOR WELDING
Filed Nov. 3, 1932   5 Sheets-Sheet 5

INVENTOR
BY ERNEST RIEMENSCHNEIDER
Louis W. Kelmuth
ATTORNEY

Patented Dec. 13, 1938

2,139,771

UNITED STATES PATENT OFFICE 2,139,771

METHOD AND APPARATUS FOR WELDING

Ernest Riemenschneider, Cleveland, Ohio, assignor to The Midland Steel Products Company, Cleveland, Ohio, a corporation of Ohio Application November 3, 1932, Serial No. 640,976

19 Claims. (Cl. 219—10)

This invention relates to a new method and apparatus for welding the unprepared edges of metal at commercial speeds in a manner similar to that disclosed in my Letters Patent No. 1,810,112 and my co-pending applications Serial Nos. 475,948 and 544,456 filed August 18, 1930 and June 15, 1931 respectively, (the latter having matured into Patent No. 2,061,671, granted Nov. 24, 1936) and the primary purpose of the present invention is to produce a highly ductile weld of great strength by the special treatment of the molten metal and adjacent edges of the stock resulting in a refined grain structure in the metal in and about the welded seam.

Another important object of the invention is to provide means for reducing unprepared edges of the stock to be united to a substantially V-shaped crater of molten metal and for moving the edges defining the crater toward one another to an extent causing the inner edges of the V-shaped crater to substantially abut and deflect one another inwardly to form a bead like structure on the inner surface of the stock being welded, this movement of the edges causing the molten metal to be squeezed from opposite sides of the seam to extrude impurities and gases while permitting a quantity of the purest molten metal to remain in the seam and subsequently solidify.

Another object is to concentrate and confine the heat which reduces the edges to molten state so that it will not spread through the stock and alter the metallurgical structure thereof.

Still another object of the invention is to reduce the temperature of the red hot welded seam as it moves out of the welding zone to the extent of fixing a grain structure and permitting cutters to be employed in shaving off the extruded seam flush with the parent metal to thereby produce a smooth joint.

Another object is to provide a supporting shoe structure beneath the seam to be welded and arranged relative to the heating unit so that no heat loss occurs by conduction into the shoe at the region of initial heating and further possesses a structure which resiliently supports the molten metal in the cleft as it is dragged thereover to preclude the same from leaking through the seam being formed.

A further object is to provide means for moving the edges of the seam toward each other closely adjacent the end of the supporting shoe to assist in trapping the molten metal as it leaves its support, this object being augmented if desired by a cooling medium contacting with the region of the seam at a point between the shoe and pressure means for squeezing the seam.

A still further object of the invention is to provide means for working the welded seam preparatory to removal of the projecting bead raised during the pressure operation.

Another object is to provide means for automatically stopping operation of the entire apparatus should the mandrel, by any chance move from its fixed position.

A further object is to provide means for rapidly bringing the edges of the stock to be welded to a molten state for their full depth without danger of damaging the adjacent parts of the apparatus from the intense heat of the zone.

A still further object of the invention is to provide the bead removing means with both vernier and rapid adjusting means.

Other objects and advantages of the invention will become apparent during the course of the following description.

In the accompanying drawings forming a part of the description and wherein like numerals are employed to designate like parts throughout the several views.

My prior Patent No. 1,810,112, granted June 16, 1931, describes a method of welding, consisting primarily of progressively raising the temperature of unprepared edges of stock forming a cleft until these edges are reduced to a molten state to run together and create an elongated narrow pool of molten metal. This pool partially fills the cleft and in order to free the metal forming the weld from all impurities, slag and gases, as well as to build up the welded seam to the same thickness as the parent metal, the edges of the molten pool are moved toward each other causing the depth of the pool to increase and after becoming semi-plastic it is rolled down causing it to become substantially flush with the inner and outer surfaces of the parent metal. In this previous method, the plastic edges of the pool were not caused to substantially abut one another to the extent of raising inner and outer beads on opposite faces of the weld or to the extent of causing the opposite bordering portions of the pool to become upset and thickened, but only sufficient pressure was brought to bear to cause extrusion of the greater portion of slag, impurities and trapped gases. While the character of weld was good and there was a decided absence of porosity and oxidation, it has been found that a superior weld can be obtained possessing increased ductility and greater strength by following the methods of my herein disclosed process.

Briefly, the present method consists of running split tubing over a supporting mandrel, separating the unprepared edges of the split to form an open cleft, subjecting the edges to intense heat to reduce them to a molten state and to create a substantially V-shaped crater of molten metal in the form of an elongated pool, bringing the edges of the pool toward each other to the extent of upsetting and deflecting the inner portions of the crater edges and creating an internal bead while extruding molten metal from the seam to belch out impurities and trapped gases and incidentally raise an external bead which is shaved off, after which the tubing is cut into pre-determined lengths, all while the tubing is moving continuously in a longitudinal direction.

In my co-pending applications Serial Nos. 475,948 and 544,456 filed respectively August 18, 1930 and June 15, 1931, a method and apparatus has been illustrated in conjunction with the formation of welded tubing from flat strip stock, either hot or cold, and while the present method and apparatus has been similarly illustrated, it is to be understood that the method is in no wise confined to the welding of tubing or to flat stock, as the essence of the invention resides in the method and apparatus for creating the weld rather than in the form of article or stock from which the weld is made. However, since the invention is especially advantageous in the formation of welded tubing it will be so disclosed in the present application.

As disclosed in my co-pending application Serial No. 475,948 filed August 18, 1930, means have been disclosed for transporting the hot strip stock directly from the rolling mill to a tube forming apparatus with the minimum loss of heat and while this is the preferred method of forming welded tubing, due to the increased speeds obtainable, it will be understood that stock at room temperature can be used and a welded seam produced which is superior in ductility, malleability and strength to welds heretofore produced in tubing with previously known methods.

Figures 1, 2:
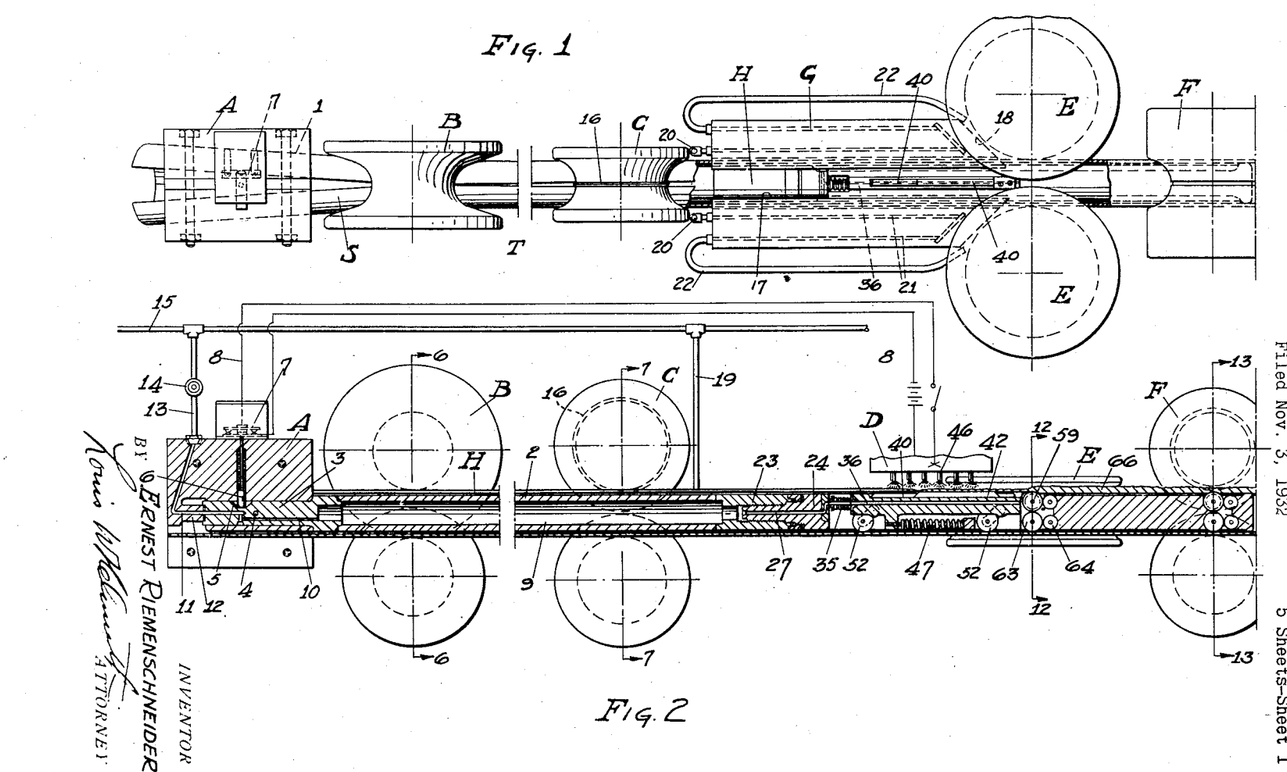
Fig. 1 is a semi-diagrammatic top plan showing the delivery end of a tube mill and the welding apparatus.
Fig. 2 is a longitudinal vertical section of the same.

As explained in my aforesaid application, the strip stock is fed to a rolling mill disposed to the left of Fig. 1, which bends the strip into substantially tubular form as it travels therethrough, delivering it into a forming shoe A, having a tapered passage or throat 1 through which the stock is moved to form it more closely into circular section by forcing the unprepared edges closer together as the stock moves through the shoe and is more closely bent around a mandrel 2. This mandrel is connected to the forming shoe A by a shear pin as will be more fully described hereinafter and extends between final forming rolls B, cleft opening rolls C, beneath a welding head D as intimately disclosed in my co-pending application Serial No. 544,456, then between a pair of pressure rolls E and out between and beyond a pair of guide or straightening rolls F. It will of course be appreciated that the portion of the mandrel projecting beyond the forming shoe A is supported indirectly by the tubing passing over the mandrel and engaging the lower rolls of sets C, E and F. If desired, a guiding and cooling shoe structure G may be provided between the rolls C and E.

The end of the mandrel 2 adjacent the rolls B is provided with a reduced end 3, polygonal in cross section, to fit a correspondingly shaped opening in the forming shoe A and is releasably retained therein by a shear pin 4 during normal operation of the apparatus. However, whenever there is a pull on the mandrel tending to separate it from the forming shoe which may be caused by tendencies of the traveling tube to move the normally stationary mandrel, the shear pin 4 will become fractured and the relative movement between the mandrel and shoe is employed, as will now be described, in stopping the operation of the entire machine. The reduced end 3 of the mandrel is provided with a notch 5 having opposite ends inclined in a direction longitudinally of the mandrel to normally receive a spring pressed trip pin 6 having its upper end arranged in proximity to a normally closed circuit breaker 7 connected by conductors 8 in a circuit or circuits for controlling not only the operation of the welding apparatus D but also the operation of the entire machine to stop the feed of the tubular stock. Thus, it will be seen that upon fracture of the shear pin 4, the reduced portion 3 of the mandrel will move longitudinally of the shoe, causing an inclined surface of the notch 5 to engage and lift the circuit breaker 7 to automatically open the circuit leading to the controls of the apparatus. Of course, the circuit breaker is also provided with manually operable means to maintain the circuit open whenever the reduced portion of the mandrel is withdrawn from the forming shoe to maintain the apparatus inoperative until the parts have again been restored to their normal operative position, at which time the spring pressed trip pin 6 will automatically enter itself in the registered notch 5 to restore the circuit breaker to circuit closing position. In order to prevent damage to the mandrel from the excessive heat created in the welding apparatus, the mandrel is equipped with a coolant chamber 9 fed from a passage 10 extending longitudinally through the reduced portion 3 out through the end of the same to be aligned with a coolant passage 11 provided in a projecting part 12 of the shoe arranged co-axially with a passage in which the reduced end of the mandrel is mounted. This projecting part 12 forms a coupling with the reduced end of the mandrel and is held with a gasket pressed against the end 3, by means of the shear pin 4. The coolant passage 11 in the forming shoe is fed by a branch pipe 13, having a valve 14 interposed therein whereby the circulation of coolant can be controlled or stopped manually whenever the mandrel moves away from the shoe. This branch pipe 13 is fed from a suitably disposed main supply pipe 15 extending longitudinally of the entire apparatus for the purposes which will be hereinafter described.

As the stock S, partially formed into tubing, emerges from the forming shoe, it passes over the mandrel between the cleft closing rolls B which exert radially inward pressure upon the stock, bringing its unprepared edges into abutment to thereby form the stock into true tubing T with a longitudinally extending slit or cleft H.

After leaving the closing rolls B, the tubing with its slit uppermost passes further over the mandrel in between a pair of cleft opening rolls C, the upper of which is provided with a peripheral V-shaped rib 16, adapted to form a wedge to enter and open the slit of the tubing and cause the edges to be separated a pre-determined distance to form an open seam cleft. From the cleft forming rolls C the tubing with the open seam cleft uppermost travels further over the mandrel and is led into a stationary guiding and cooling shoe G which has a longitudinal passage longitudinally thereof to slidably receive the tubing as it is drawn longitudinally over the mandrel. The top of this passage is provided with a longitudinally extending opening to expose the open seam cleft H, and to shield adjacent margins of the tubing from the intense heat of the welding apparatus. The guiding shoe G adjacent the pressure rolls E is provided with rearwardly diverging portions 18, to provide a wedge shaped structure adapted to be disposed closely between the pressure rolls to a considerable extent to keep as much as possible of the intense heat from the welding apparatus away from these rolls. In order to maintain the guiding shoe at a uniform temperature, a branch pipe 19 is led from the main coolant conduit 15 to branch off into a pair of feed pipes 20 leading into one end of the shoe at either side of the tubing for the purpose of feeding coolant to longitudinally extending passages 21 in the shoe structure. Discharge of the coolant from the shoe structure is effected through a pipe 22 at each side of the shoe, which pipe extends longitudinally thereof as best seen in Fig. 1 to terminate at a point between the end of the guiding shoe and the rolls E to spray coolant upon the latter and maintain them at a uniform temperature.

Figure 3:
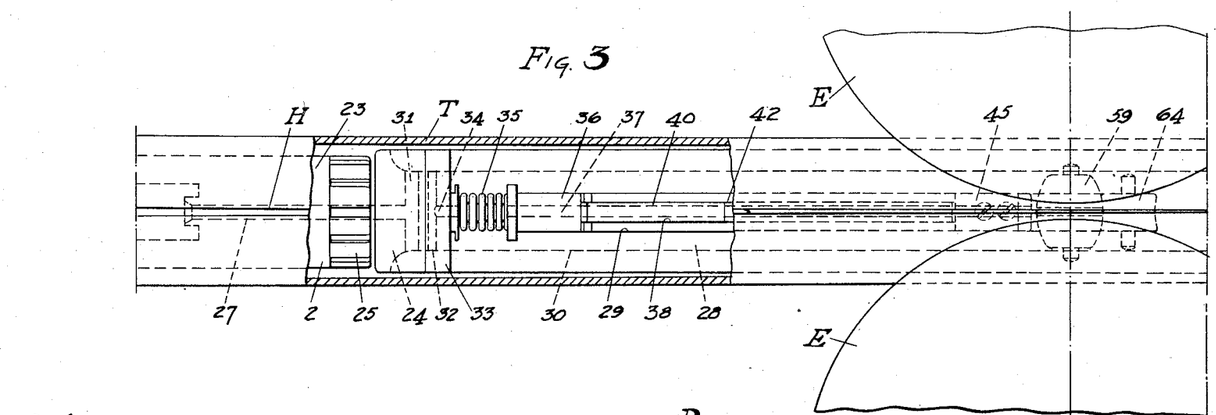
Fig. 3 is a top plan of a section of tubing to be welded with its cleft uppermost and a portion of the tube removed to illustrate the supporting mandrel.
Figure 4:
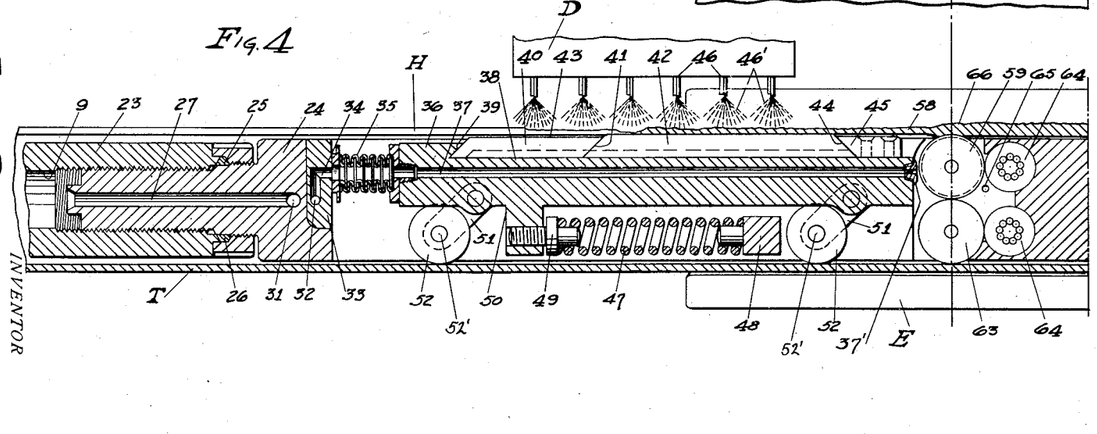
Fig. 4 is a vertical longitudinal section of the same illustrating the relative positions of the welding head and pressure rolls.

Referring now more particularly to Figs. 2, 3 and 4, it will be noted that the mandrel 2 has been illustrated as a built up sectional structure but obviously it may be a one piece device suitably reamed, cored and recessed to properly house and support the various adjuncts essential to its proper performance and assistance to the production of a superior weld. In the present illustration the reduced extension 3 of the mandrel is illustrated as a member separate from the section between the rolls B and C, but secured thereto in any suitable manner. This section between the two sets of rolls is a tubular section providing the enlarged coolant chamber 9 as previously described. The next adjacent section of the mandrel is indicated by the numeral 23 and consists of an interiorly threaded tube adapted to receive the reduced threaded portion of a head 24, mounted on the reduced portion of which is a gasket clamping ring 25 for clamping a gasket 26 on the end of the tube 23 to effect a fluid tight seal between these two elements. Of course, the tube 23 is provided with a longitudinal passage which registers with a longitudinal passage 27 of member 24. The head 24 constitutes one end of a shoe carrying portion 28 of the mandrel. This shoe carrying portion is provided with a longitudinally extending shoe receiving cavity 29, in the form of an elongated slot extending from top to bottom of the mandrel and from the head 24 to a point beyond the welding apparatus D. The mandrel at opposite sides of this slot or cavity 29 is provided with longitudinally extending coolant chambers or passages 30, fed from lateral passages 31 in head 24 communicating with the longitudinal passage 27. Lateral coolant passages 32 are provided in a feeder block 33 suitably secured to head 24 and communicate with the longitudinal passages 30 for conveying coolant to the feeder block and discharging it through a longitudinal passage 34 opening out into the face of the block arranged transversely of the cavity 29. A flexible metal bellows or metallic "Sylphon" 35 forms an extensible connection between the feeder block 33 and a weld supporting shoe 36 to convey coolant from passage 34 into a passage 37 extending longitudinally throughout the length of the shoe 36 to discharge coolant into the cavity 29 through a restricted nipple 37' at its opposite end. The upper face of shoe 36 is provided with a longitudinally extending seat or recess 38, one end 39 of which is undercut to receive a beveled end of a heat resistant block 40 which may be "malarc" or any other suitable heat resistant material. The other end of this block 40 is beveled off parallel to its opposite end to receive thereunder a beveled end 41 of a second "malarc" block 42 which is a trifle deeper than its complementary block 40 whereby its upper surface can be retained in contact with the inner surface of the tubing to span the seam cleft while retaining the upper surface 43 of block 40, spaced a slight distance away from the inner surface of the tubing so as not to dissipate any of the heat created by the welding apparatus D from the two edges of the stock forming the seam cleft H. The outer end 44 of block 42 is beveled in a direction opposite to that of its opposite end to be retained under an under-cut clamping block 45, removably secured to the body of shoe 36. This difference in height of the insulating blocks 40 and 42 and their arrangement with respect to the individual heating elements of the welding apparatus D is considered of material importance to the rapidity with which the edges of the cleft are reduced to a molten state for their full depth or thickness. In this connection, it will be noted from Fig. 4, that six independent heating elements 46 are illustrated and their number may be increased or diminished according to the work to be done and the speed of movement of the tubing over the shoe. These heating elements may be any desired type for the creation of an elongated heating zone capable of progressively increasing the temperature of the edges of the cleft to a point of reducing them to a molten state throughout the full thickness of the stock, but are preferably a series of closely disposed atomic hydrogen torches of the type disclosed in my co-pending application Serial No. 544,456. As explained in my former applications, it is of vital importance to arrange the electrodes of the individual pairs as closely together as is commensurate with efficient electrical action thereof to the end that the arc flames of adjacent electrodes will substantially touch or overlap to form a substantially continuous elongated arc parallel to and directly above the open seam cleft. It is also important that the individual arcs be individually controllable to increase or diminish the heat created thereby at the will of an operator with provision for individual control of the high and low pressure means of hydrogen gas projected between and about the individual electrodes and to provide means for individually adjusting the distance between each pair of electrodes and the work, as described in my aforesaid co-pending application. Up to the present time, it has been found advantageous to arrange the parts so that the insulating block 40 is disposed under the leading or first two heating elements and spaced from the inner surface of the tubing so that no heat will be dissipated by contact of the block 40 with the tubing. The other block 42 is disposed beneath the remaining heating elements and in contact with the underside of the tubing to form a dam for the molten metal resulting from melting down of the edges of the cleft and to prevent this molten metal from leaking through the seam and impairing the weld as well as endangering the operation of the machine.

The block 42 is resiliently pressed into engagement with the underside of the seam by means of the influence of a spring 47, disposed beneath the supporting shoe 36 in cavity 29. One end of this coil spring is supported by and abuts against a stationary abutment block 48, fixed across cavity 29 in the mandrel, while the other end of this spring contacts with an adjustable abutment screw 49 threaded into a depending lug 50 of the supporting shoe 36. Pairs of inclined links 51 are pivotally connected at their upper ends to opposite sides of the shoes 36 adjacent opposite ends thereof and rollers 52 are rotatably supported on shafts 52' having their ends mounted in the opposite side walls of cavity 29 and between the lower ends of each pair of links 51 to project beyond the periphery of the mandrel and engage the bottom interior surface of the tubing thereby causing elevation of the shoe 36 with respect to the mandrel under the influence of spring 47.

Figures 6, 10:
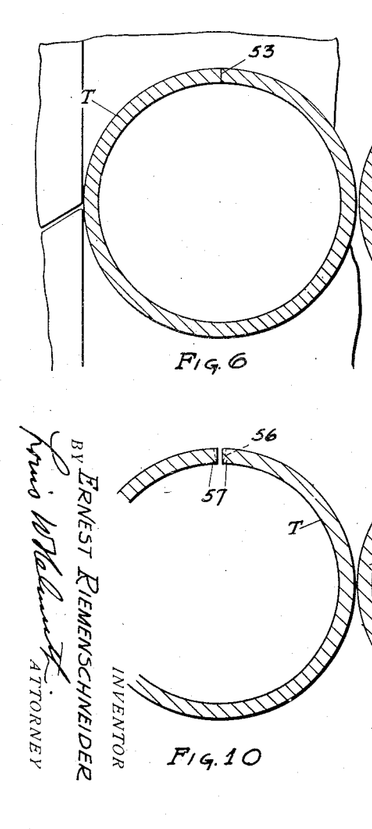
Fig. 6 is an enlarged transverse section of the tubing taken approximately on the lines 6—6 of Fig. 2.
Fig. 10 is a similar view of the tubing after the third pair of arcs have operated thereon to form the edges of the cleft into a substantially V-shaped crater of molten metal supported by the shoe of the mandrel.
Figures 7, 8, 11, 12:
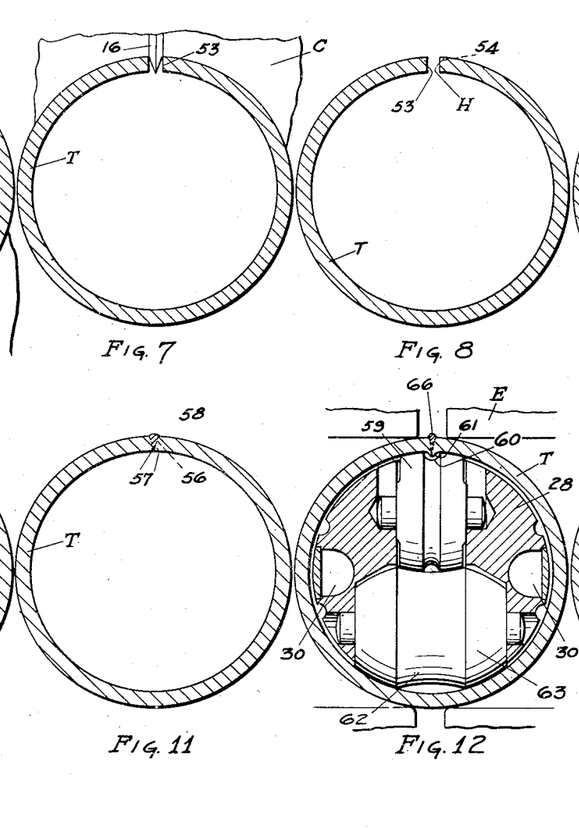
Fig. 7 is a similar view taken on the line 7—7 of Fig. 2.
Fig. 8 is a similar section taken through the tubing at a point adjacent the first two arcs of the welding apparatus illustrating in dotted lines the manner of gradually melting down the edges of the seam cleft.
Fig. 11 is a similar view of the tubing illustrating the relative positions of the edges of the molten crater upon initial pressure causing the edges to approach one another.
Fig. 12 is a similar section taken on the line 12—12 of Fig. 2 illustrating the mandrel construction and supporting rollers at the point where the edges of the molten crater are moved into substantial abutment to cause upsetting of the edges and turning in of a partial bead interiorly of the tubing while causing the molten metal to be extruded between the edges and to form an exterior bead on the seam.
Figure 9:
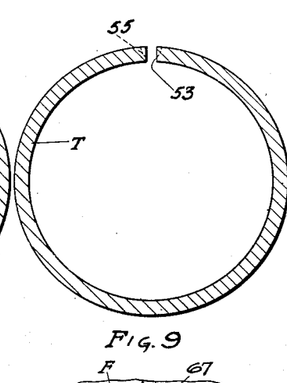
Fig. 9 is a similar section of the tubing taken approximately at the point between the second and third pairs of arcs.

Up to this point in the operations, the edges of the tubing have received the treatment depicted in Figs. 6 to 10 inclusive. Fig. 6 shows the condition of the tubing T after passing between the rolls B, thereby causing edges 53 of the tubing to be disposed in substantial abutment, or approximately so, whereby they may be subsequently separated a pre-determined distance by the rib 16 of roll C as depicted in Fig. 7 to form the open cleft H prior to the movement of the cleft under the welding apparatus D. The dotted lines 54 in Fig. 8 illustrate the extent and shape to which the edges 53 are melted down under the influence of the leading pair of arcs, whereas the dotted lines in Fig. 9 show the extent to which the edges have been melted by the time the edges reach the third or fourth arc. The dotted lines 56 of Fig. 10 show the shape and extent to which the edges of the cleft have been melted after passing beneath the entire battery or series of arcs and the edges of the cleft have been moved slightly toward each other under the influence of closely adjacent pressure rolls E to be presently described, thereby causing the cleft to be substantially filled with the molten metal derived from melting down the edges of the parent stock. It is to be especially noted that the edges 56 of the molten pool converge inwardly to define a substantially V-shaped crater of molten metal with the inner portions 57 reduced to substantially plastic feather edges. By reason of the tapering of the edges 57 by the manner of melting them down, upsetting and deflection of such edges is induced as pressure is brought to bear upon the tubing. It will also be evident from the intense heat derived from the heating elements, that an elongated pool of molten metal extending longitudinally of the tubing is created in the cleft and is supported by the block 42 as the cleft, together with the tubing, is continually moving longitudinally through the apparatus until the inner edges 57 of the crater begin to feel the influence of the pressure rolls E and begin moving toward each other until they are brought into contact as shown in Fig. 11. Just prior to reaching this stage, the bottom of the seam as it leaves supporting block 42 begins to become semiplastic to support the gradually solidifying molten pool, due to the cooling effect thereon of coolant flowing out from the nipple 37' which has the effect of cooling the shoe structure and a roller 59, journaled in the body of the mandrel and rolling in contact with the underside of the tubing at opposite sides of the welded seam. The periphery of this roller is provided with a circumferential groove 60 which permits upsetting and deflection of the plastic edges of the seam and the raising of a small internal bead 61 as shown most clearly in Fig. 12. The outer peripheral surface of the roller 59 is convex and adapted to have rolling contact with a concave groove 62 of a roller 63 also journaled in the mandrel beneath the axis of roller 59. It will be noted that opposite ends of this roller 63 are convex to conform to the curvature of the inner walls of the tubing and properly sustain the walls in true circular cross section in spite of inward radial pressures exerted on the tubing by the rolls E. In order to properly resist the thrust exerted on the pintles of the rollers 59 and 63, ball bearing rollers 64 are mounted in the mandrel with their peripheries in contact with the peripheries of the rollers. If desired, the opposite walls of the cavity in which these four rolls are mounted may be provided with coolant outlet passages 65, communicating with the longitudinal passages 30 in that coolant will contact with the rollers and be carried by roller 59 into contact with the edges of the tubing adjacent the welded seam to assist in cooling the same.

The rollers 59 and 63 are of course arranged with their axes in the same transverse plane of the axes of rolls E to properly support the tubing in true circular form at the point where the rolls E exert the maximum inward radial pressures upon the tubing. The pressure created by the rolls E causes the plastic feather edges 57 of the seam to abut and become deflected inwardly at the same time slightly upsetting the plastic portions of the seam. The approach of the plastic edges of the seam defining the molten pool causes the sides of the V-shaped crater to be moved toward each other until they almost touch one another, thereby squeezing some of the molten metal out from between the plastic edges. Most of this molten metal is extruded from between the plastic edges outwardly of the tubing to belch out impurities, slag and gases, and at the same time raise an external bead 66. A slight extrusion of the molten metal may occur between the deflected edges 61 of the internal bead, but only in an amount sufficient to cause perfect adhesion between the welded edges and to rid the lower regions of the seam from impurities and gases.

Figure 13:
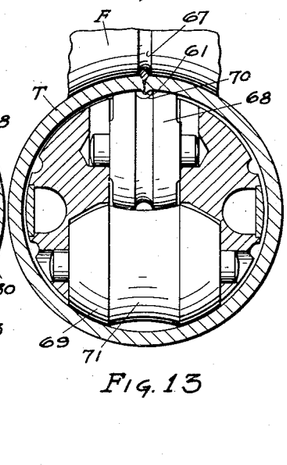
Fig. 13 is a similar section taken on the line 13—13 of Fig. 2.

After the molten metal is squeezed up to form the bead and contacts with the atmosphere, it begins to gradually cool but is still red hot when it reaches the rolls F, which, as shown in Fig. 13, are merely guide rolls, the upper of which is provided with a peripheral groove 67 deep enough to provide clearance for the passage of the red hot bead 66. Mounted on axes in the same vertical plane with the axes of rolls F, are rollers 68 and 69 identical with the rollers 59 and 62, the roller 68 being provided with a peripheral clearance groove 70 for the passage of the internal bead of the tubing, while roller 69 is provided with a concave surface 71 for rolling contact and support of roller 68. Of course, the peripheries of both of these rollers contact with the interior surface of the tubing to facilitate its sliding over the mandrel.

Should it be desired to mechanically work the metal of the welded seam and adjacent edges of the stock, the pressure rolls E may be disposed closer together to exert greater circumferential pressure on the tubing to cause the portions of the tubing adjacent the seam to become upset as at 72, in which event modified rollers 59' and 62' are mounted in the mandrel in which case the upper roller 59' is equipped with a flat bearing surface which precludes the raising of an internal bead on the tubing and causes such metal to become upset and to flow into the thickened portions 72. If it should be desired to work the red hot bead to improve its metallurgical structure, the upper roller F' may be provided with a flat surfaced groove 67', the bottom of which is adapted to engage and compress the exterior bead 66 thereby giving it the flattened form shown at 73 in Fig. 15. In this event, the rollers 68' and 69' may assume the same configuration as rollers 59' and 62' shown in Fig. 14.

Figure 5:
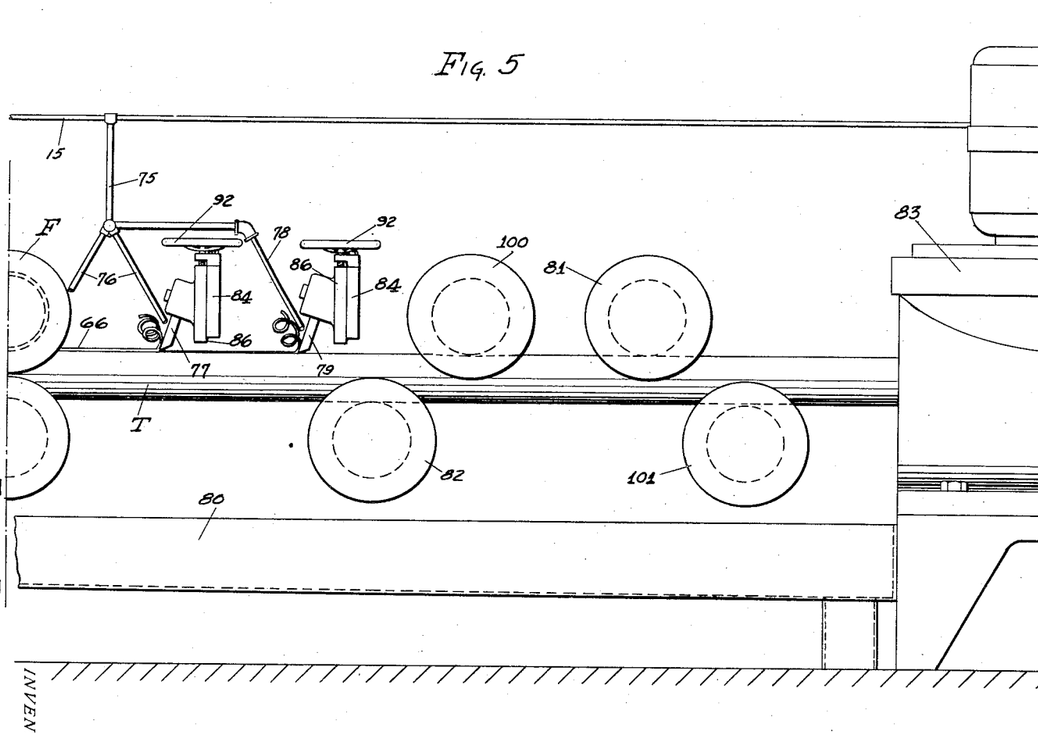
Fig. 5 is a semi-diagrammatic side elevation of the trimming and cutoff apparatus arranged to the right hand end of Fig. 2.

As indicated hereinbefore, the coolant pipe 15 extends longitudinally of the machine and is provided with a branch conduit 75, having outlet branches 76, one of which is directed to discharge coolant on the periphery of upper roll F or F', to drain down upon the seam 66 of the tubing and quench the same prior to it reaching a primary cutting tool 77, which is preferably adjusted to remove approximately one-half of the bead 66, as clearly shown in Fig. 5. The coolant conduit 75 is provided with a second branch pipe 78, adapted to spray coolant on a secondary cutter 79, which is preferably adjusted to remove the balance of the extruded seam 66 so as to render the seam substantially flush with the outer periphery of the tubing. The coolant draining from the cutters and tubing is caught in a sump pan 80 disposed thereunder and in order to maintain the tubing straight and to preclude its tendency to bow, upper and lower straightening rolls 81 and 82 are arranged to contact with the top and bottom of the tubing at widely separated points to provide a long lever arm. Guide rolls 100 and 101 are provided to cooperate with the two straightening rolls, the roll 100 being disposed between the rolls 81 and 82 over the top of the tubing, while guide roll 101 is disposed beneath the tubing beyond the roll 81. The tubing is guided between these two pairs of rolls and thence accurately into an automatic flying cutter 83 having a reciprocable cutter carriage which automatically grips the tubing after a predetermined length thereof has entered the same and moves along with the tubing while the cutters are operating to cut off a predetermined length. When this carriage reaches the predetermined length set for the sections of tubing, it automatically releases its grip upon the tubing and moves toward the straightening rolls a predetermined distance, after which it may pause and then automatically grip the tubing again to move along with the same while cutting off another section.

Figures 14, 15, 16, 17:
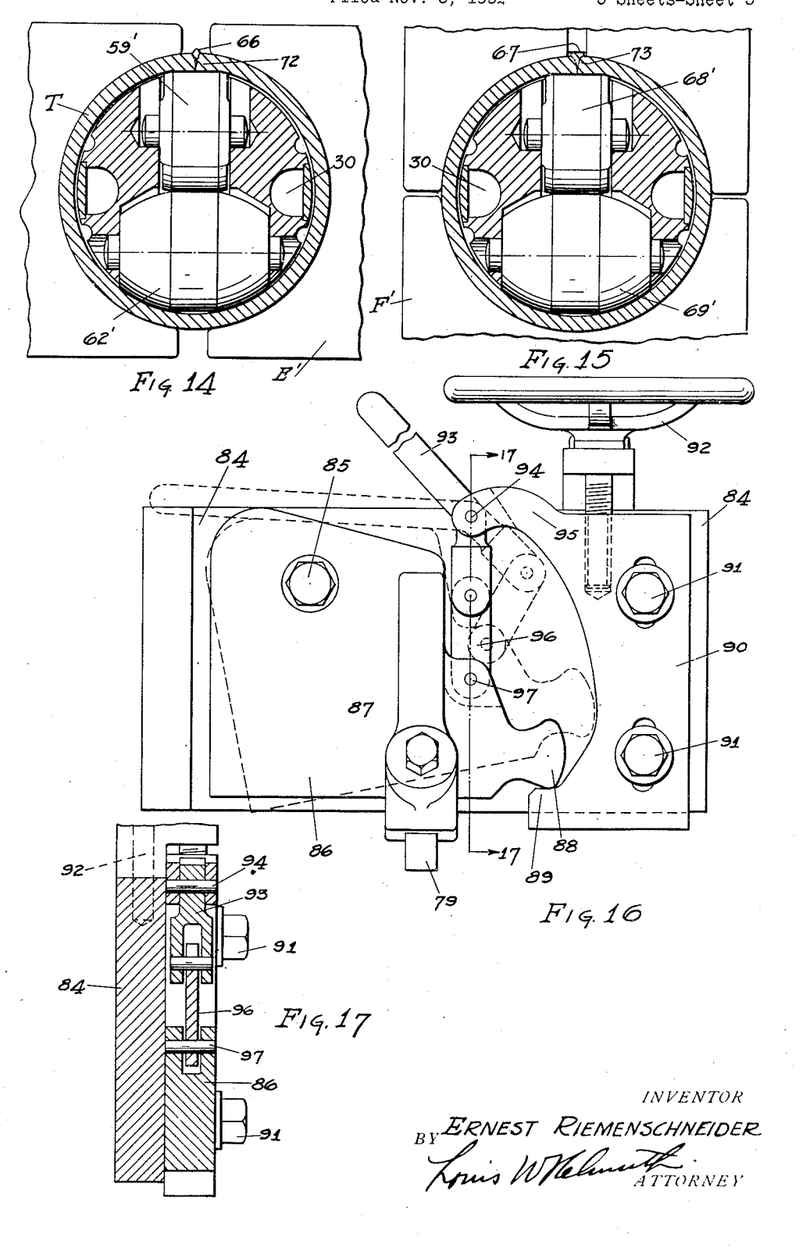
Fig. 14 is a similar section of a modified or alternative treatment of the seam at the section 12—12 of Fig. 2 illustrating an upsetting or thickening of the stock adjacent the seam without the formation of the interior bead.
Fig. 15 is a similar section taken on the line 13—13 of Fig. 2 illustrating a modified form of treatment of the seam including a working or rolling down of the exterior bead.
Fig. 16 is an elevation of the means for making vernier and rapid adjustments of the bead removing means.
Fig. 17 is a transverse section of the same taken on the line 17—17 of Fig. 16.

Rapid and vernier adjustments for each of the cutters are shown in Figs. 16 and 17 wherein a suitable support 84 forms a pivotal mounting as at 85 for a cutter carrier 86. A tool holder 87 is of course rigidly connected to the carrier 86 for mounting of the tool 77 or 79. The free end of the pivoted tool carrier is provided with an extension 88 serving as a stop to limit the movement of the tool toward the tubing by its abutment with a shoulder 89 formed on a vertically adjustable plate 90. This adjustable plate is vertically slidably connected by means of the bolts 91 through the support 84 and a hand screw 92 is threaded through an extension of the support for engagement with the adjustable plate 90 for making venier adjustments of the tool.

In order to provide means for rapidly adjusting the tool toward or from the tubing, a bell crank lever having a handle 93, is fulcrumed as at 94 on an extension 95 of the adjustable plate 90 with one end of the bell crank depending below this mounting to be pivotally connected to the upper end of a link 96, having its lower end pivotally connected as at 97 to an extension on the free end of the carrier 86. By reason of this construction, it will be obvious that the tool carrier and tool may be rapidly moved away from the tubing by swinging the handle 93 downwardly and without disturbing the vernier adjustments 92 and again returned to its normal operating position by swinging the lever 93 upwardly causing the abutment 86 to be lowered into engagement with the supporting shoulder 89 of the adjusting plate 90.

It is to be understood that various changes in the shape, size, arrangement of parts and the sequence of steps in the method may be varied without departing from the spirit of the invention or scope of the appended claims.

I claim:

1. The method of welding edges of stock consisting of reducing the edges of a cleft to molten condition to create a pool, moving the stock and pool of molten metal over a support, cooling the metal at the bottom of the pool whereby it becomes sufficiently plastic to support the pool after leaving the support, and then subjecting the stock to pressure transversely of the seam to move the edges toward each other to the extent of causing the plastic portions of said edges to abut and extrude molten metal between the plastic edges.

2. In an apparatus for welding tubing having an open seam cleft, a mandrel having a coolant passage and a cavity and over which the tubing is moved, a relatively movable shoe mounted in said cavity and normally urged into contact with the inner surface of the tubing under said cleft, said shoe having a coolant passage, and an extensible conduit forming a connection between the passages of the mandrel and shoe.

3. In an apparatus for welding tubing, a mandrel fitting within the tubing and over which the same is moved and supported, a heating device under which the tubing having a cleft is guided by said mandrel and adapted to reduce the edges of the cleft to a molten state, means associated with the mandrel for supporting the molten metal, and said mandrel having a coolant passage provided with an outlet to direct the coolant upon the underside of the metal in the cleft.

4. In an apparatus for welding tubing, an elongated mandrel fitting within the tubing and over which the same is moved and supported, a heating device under which the tubing having a cleft is guided by said mandrel and adapted to reduce the edges of the cleft to a molten state, means associated with the mandrel for supporting the molten metal, a pair of pressure rolls on opposite sides of the tubing for contracting the same about the mandrel to cause the edges to move toward each other and extrude some of the molten metal from the seam, a roller engaging the inner periphery of the tube at opposite sides, of the seam and said mandrel having a coolant passage provided with an outlet to direct coolant upon the periphery of said roller.

5. In an apparatus for welding tubing, an elongated mandrel fitting within the tubing and over which the same is moved and supported, a heating device under which the tubing having a cleft is guided by said mandrel and adapted to reduce the edges to a molten state, the mandrel having a cavity, a shoe mounted in said cavity and urged into contact with the underside of the cleft, rollers engaging the inner surface of the tubing and having axles journaled in the mandrel links pivotally connected to the shoe and axles, abutments on the shoe and mandrel within the cavity, and a compression spring acting on said abutments to urge the shoe toward the cleft.

6. In an apparatus for welding the edges of traveling stock material having edges in substantially opposing parallel spaced relationship to form an open seam cleft, means for holding said edges in said spaced relationship, means for producing an elongated and substantially continuous heating zone at and parallel to said seam cleft for melting said edges for the full depth thereof, and means for retaining the molten metal in the open seam cleft to form a long narrow molten pool, and means to move the edges relatively toward each other whereby the width of the seam cleft is reduced and the cleft is filled with molten metal.

7. In an apparatus for welding the edges of stock material having the edges in substantially opposing parallel spaced relationship to form an open seam cleft, means for holding said edges in said spaced relationship, means comprising a series of electric arc producing devices arranged closely together in a row for producing an elongated and substantially continuous heating zone at and parallel to the seam cleft and for melting the edges for the full depth thereof, means for retaining the molten metal in the open seam cleft to form an elongated narrow molten pool, and means to cause relative longitudinal movement between said electric arc producing devices and the edges of the seam cleft.

8. In an apparatus for welding tubing, a heating device under which the tubing having a cleft is guided for reduction of its edges to a molten state, a pair of pressure rolls on opposite sides of the tubing rearwardly of the heating device for contracting the tubing to cause the edges to move toward each other and for extruding some of the molten metal from the seam, a roller between the pressure rolls and engaging the inner periphery of the tube at opposite sides of the seam, and means for directing a coolant upon the periphery of said roller.

9. In a welding apparatus, means for feeding tubing with a seam to be welded, a guiding member through which the tubing is moved, said member having a slot extending longitudinally thereof to expose said seam, a heating unit having a substantially flat bottom surface disposed in close proximity to the top of said member and overlying the slot, means carried by the unit for projecting a welding flame upon the seam of the tubing exposed between the edges of said slot, said heating unit having its bottom surface continuous and co-extensive with said member, and said member serving to prevent curling of the flame around the tubing and cooperating with the bottom of said heating unit to form a restricted space from which air is excluded by the flame impinging the surfaces of the heating unit to thereby completely fill the restricted space therebetween with burning gas.

10. In a welding apparatus, means for feeding tubing with a seam to be welded, a pair of side pressure rolls engaging opposite sides of the tubing, a heating unit having a portion extending above the two rolls, a guiding and cooling member through which the tubing is moved, said member having a tapered portion fitting between said rolls, said member having a slot extending longitudinally thereof to expose said seam, said heating unit having means for projecting a welding flame upon the seam of the tubing exposed between the edges of said slot, and said member serving to prevent curling of the flame around the tubing and cooperating with the bottom of said heating unit to form a restricted space from which air is excluded by the flame impinging the surfaces of the heating unit and member to thereby completely fill the restricted space therebetween with gas.

11. In a welding apparatus, means for feeding tubing with a seam to be welded, a pair of side pressure rolls engaging opposite sides of the tubing, a heating unit having a portion extending above the two rolls, a guiding and cooling member through which the tubing is moved, said shoe having a slot extending longitudinally thereof to expose said seam, said heating unit having its bottom surface disposed in close proximity to the top of said member, said heating unit having means for projecting a welding flame upon the seam of the tubing exposed between the edges of said slot, and cooling means for said member including a conduit having its outlet arranged between the side pressure rolls for spraying coolant upon the latter.

12. In a welding apparatus, an electrical welding unit, means for feeding tubing to be welded thereto and including a forming throat, a mandrel for guiding the tubing to the welding unit, a sheer pin connecting the mandrel to said throat, a trip operated by relative movement of the mandrel and throat, and a circuit breaker for controlling the welding unit connected with the trip to be operated thereby.

13. In a welding apparatus, an electrical welding unit, a circuit breaker for controlling the welding unit, means for feeding tubing to the welding unit and including a forming throat, a mandrel for guiding the tubing to the welding unit, a shear pin connecting the mandrel to said throat, said mandrel having an inclined shoulder, and a trip pin mounted in said throat and having one end engaging said shoulder and its other end operating the circuit breaker upon shearing of said shear pin by relative movement of the mandrel and throat.

14. In an apparatus for welding tubing, a heating device under which the tubing having a seam cleft is guided for heating of the edges of the cleft, a pair of pressure rolls on opposite sides of the tubing for contracting the same and uniting the heated edges, a roller between said pressure rolls engaging the inner periphery of the tubing at opposite sides of the cleft, and a supporting roller having a supporting surface engaging the intermediate portion of the first mentioned roller and having transverse convex surfaces on opposite sides of its intermediate portion engaging the inner periphery of the tubing.

15. In an apparatus for welding tubing, a heating device under which the tubing having a seam cleft is guided for the heating of the edges of the cleft, a pair of pressure rolls on opposite sides of the tubing for contracting the same and uniting the heated edges, a roller between the pressure rolls having a transverse convex surface engaging the inner periphery of the tubing at opposite sides of the seam, and a supporting roller having a concave intermediate surface engaging the convex surfaces of the first mentioned roller and also having transverse convex surfaces on opposite sides of its intermediate supporting portion engaging the inner periphery of the tubing.

16. In an apparatus for welding a seam in tubing, a mandrel within the tubing and over which the same is moved, a shoe supported from said mandrel and having an elongated, substantially flat supporting surface adapted to engage the inner side of the tubing, and means for yieldably urging the shoe longitudinally in a direction opposite to the direction of movement of the tubing and radially of the tubing against the inner side thereof, and said shoe being yieldable in the direction of movement of said tubing and radially of said tubing away from the inner side thereof, the elongated, substantially flat supporting surface of the shoe, in all longitudinal and radial positions of the shoe, remaining substantially parallel to the inner surface of said tubing.

17. In an apparatus for welding a seam in tubing, a mandrel within the tubing and over which the same is moved, an elongated shoe having parallel linkage at each end pivoted to the mandrel, and spring means urging the shoe to move upon the linkage against the inner side of the tubing.

18. In an apparatus for welding the edges of traveling stock material having edges in substantially opposing parallel spaced relationship to form an open seam cleft, means for holding said edges in said spaced relationship, means for producing an elongated and substantially continuous heating zone at and parallel to said seam cleft for melting said edges for the full depth thereof, and means for retaining the molten metal in the open seam cleft to form a long narrow pool, said last-mentioned means comprising a shoe underlying the seam cleft and coextensive with the long narrow molten pool, and means to move the edges relatively toward each other whereby the width of the seam cleft is reduced and the cleft is filled with molten metal.

19. In an apparatus for welding the edges of stock material having the edges in substantially opposing parallel spaced relationship to form an open seam cleft, means for holding said edges in said spaced relationship, means comprising a series of electric arc producing devices arranged closely together in a row for producing an elongated and substantially continuous heating zone at and parallel to the seam cleft and for melting the edges for the full depth thereof, means positioned adjacent the seam cleft and arc producing devices and on that side of the seam cleft opposite said series of arc producing devices for retaining the molten metal in the open seam cleft to form an elongated narrow pool, and means to cause relative longitudinal movement between said electric arc producing devices and the edges of the seam cleft.

ERNEST RIEMENSCHNEIDER.